United States Patent [19]
Ravin et al.

[11] 3,797,129
[45] Mar. 19, 1974

[54] HEART SOUNDS TEACHING AND DISPLAY APPARATUS

[75] Inventors: Abe Ravin, 45 S. Dahlia St., Denver, Colo. 80222; Gerald L. Schlatter, Boulder, Colo.

[73] Assignee: said Ravin, by said Schlatter

[22] Filed: Nov. 10, 1972

[21] Appl. No.: 305,633

[52] U.S. Cl. .................................................. 35/17
[51] Int. Cl. ........................................ G09b 23/28
[58] Field of Search ...................................... 35/17

[56] References Cited
UNITED STATES PATENTS
3,399,467   9/1968   Ravin .................................... 35/17
3,564,729   2/1971   Ackerman ............................. 35/17
3,665,087   5/1972   Poylo .................................... 35/17

*Primary Examiner*—Harland S. Skogquist
*Attorney, Agent, or Firm*—C. B. Messenger

[57] ABSTRACT

A heart sound simulator for the teaching of cardiac auscultation and diagnosis procedures which utilizes a plurality of separate bands of sound related signals for combination in cyclic and timed sequence to simulate heart pulse cycles or arrhythmic combinations thereof. A program element having instructional and indexing material thereon for visual observation is placed in fixed position as a signal gating element to selectively and/or periodically intercept circuits inclusive of photosensitive elements for the control of said circuits as necessary to duplicate various normal and abnormal heart conditions. Some elements of said circuits are movable and at variable rates whereby various pulse cycles are simulated as the light transmission or signal gating patterns are correspondingly varied. Sound output, sound and electrocardiogram display means and recording and play-back components are provided. Patient derived heart sounds, phonocardiograms and electrocardiograms may be displayed and/or recorded for sound and visual comparisons.

30 Claims, 7 Drawing Figures

HEART SOUNDS TEACHING AND DISPLAY APPARATUS

CROSS-REFERENCE TO RELATED APPLICATION

The apparatus disclosed herein may be used together with componens shown and described in a copending application by Abe Ravin entitlted Blood Pressure Teacher and bearing Ser. No. 305,754.

BACKGROUND OF THE INVENTION

In previous U.S. Pat. No. 3,399,467 issued to one of the inventors herein an instrument was disclosed for duplicating or simulating the sounds of the human heart that are associated with normal and abnormal conditions thereof. Through provision of a source for separate bands of sound that are characteristic of the different heart functions and through use of signal gating means for controlling the release of such sounds in patterned arrangement, previous difficulties in the teaching of heart auscultation procedures were alleviated. The benefits that were gained through use of the previous development were significant, and, accordingly, such previous development represents a substantial improvement over previous teaching practices that were far too dependent upon the availability of patients that have abnormal heart conditions. The heart sounds produced by instruments made in accordance with the previous invention could be disseminated together with correlated electrocardiogram signals so that students and observers were able to better recognize any functional heart abnormalities. With the previous instruments considerable operator manipulations were required. These manipulations were to be accomplished in accordance with instructions provided. Where the instructions were not followed correctly the observing students would hear erroneous sound patterns that might seriously disrupt the total learning process.

To improve the teaching results and to avoid operator mistakes and errors, a new instrument embodiment is presented herein which coordinates the positioning of instructional materials and manipulative controls so that operator errors are minimized. Additional features provide a visual alarm or signal whenever an operator mistake has been made. With this improved control the operations are substantially simplified, and the instrument, accordingly, is of greater utility since it can now be easily understood and used by individual students.

SUMMARY OF THE INVENTION

The present invention provides an instrument for simulating the sounds of the heart and for presenting the simulated sounds for dissemination by speakers or phones. The instrument incorporates visual display apparatus that can provide simultaneous presentations of correlated electrocardiograms or phonocardiograms. The generated heart sounds can be recorded separately or conjointly with actual patient heart sounds, and any materials recorded, inclusive of electrocardiogram or phonocardiogram related signals, can be subsequently played for later observation. A patient auscultation component is included so that the heart sounds and/or a phonocardiogram derived from the patient can be presented for comparison with signals generated by other components of the instrument.

In order to provide the simulated heart sounds, elements or components of the apparatus separate or generate sound sources that will be released in accordance with the operation of signal gating components. A white sound or speech sound generator capable of producing sound related signals over a wide band of frequencies is interconnected to band pass filters to break such wide band signals into component sound bands of generally narrower frequency ranges. Selected bands of sound signals that are characteristic of particular heart functions are then used to simulate the sounds of such heart function. The signals from selected bands are released by a program card that can interrupt the transmission of light from a light source to band selector photosensitive cells or resistors that are connected in specific circuits. If the signals from a particular band are to be used in simulation of a particular heart function, a light transmissive area is provided in the program card in position of registration with the band selector photoelectric cell to energize that circuit. The signal is then conducted to a moving photosensitive element, such as a photoelectric cell or resistor, that rotates in circular pattern with respect to the program card. The movement pattern for the moving photoelectric cells is known, and light transmissive areas are established in circumferentially disposed positions about such movement pattern so that light will be transmitted to the moving photoelectric cell on an interrupted cyclic pattern. Such cyclic pattern is coordinated with the desired release of the selected sound. In this manner several separate sound signals from separate bands can be delivered to separate rotating photoelectric cells, and the combined sound thus released by operation of the photosensitive elements will be transmitted to components for audio dissemination. The selection of the particular bands of sound energy and the release pattern therefor is all established by the program card which is inserted into intercepting position with respect to the band selector photoelectric cells and the rotating photoelectric cells. Any particular sounds thus selected can also be separately emphasized by manual manipulation of associated controls. The separate sounds can be turned on or off or they may be adjusted in volume by an operator to isolate desired sounds or to demonstrate potential patient related variations and abnormalities. A moving table supports a plurality of moving photoelectric cells so they are all moved in correlated but non-concentric circular paths. The non-moving program card has instructional materials thereon that are exposed and illuminated for convenient viewing by the operator.

DESCRIPTION OF THE PREFERRED EMBODIMENTS

Figure 1:
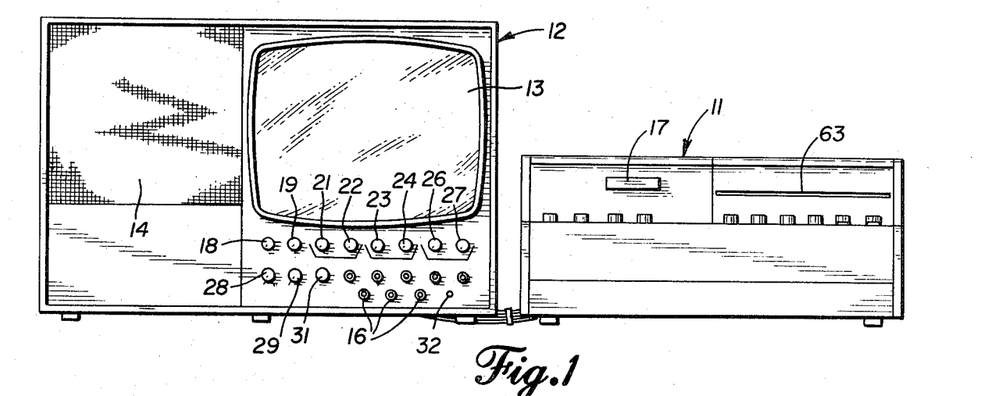
FIG. 1 is a front elevation showing the display scope and a control console used in a preferred embodiment of the invention.
Figure 2:
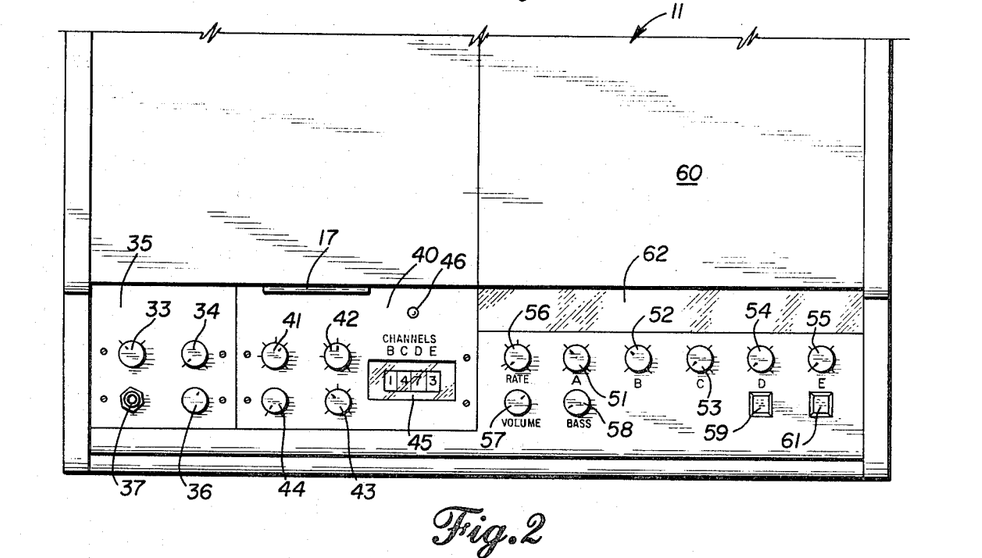
FIG. 2 is a top plan view of the control console component shown in FIG. 1.

FIG. 1 shows features and configuration for a control console 11 and a display unit 12. A top view of the control console 11 is shown in FIG. 2. Display unit 12 provides an oscilloscope 13 for the display of electronic patterns of interest. A speaker is housed within the display unit 12 in area 14. A plurality of stethophone jacks 16 are also provided for audio presentations. The jacks 16 and speaker 14 are used additionally for audio instuctions and for the presentation of the heart sounds generated by the control console 11 or as separately presented by a tape recorder-player 17. The oscilloscope 13 of display unit 12 desirably has multi-trace capabilities. Controls for the illustrated display unit 12 may be separately identified. An On-Off and volume control 18 for sound presentations is adjacent to a tone control 19. Knobs 21 and 22 provide gain and position control for Sound traces, while knobs 23 and 24 provide gain and position control for electrocardiogram trace signals. Control knobs 26 and 27 provide speed and intensity control for the osiclloscope beams. In the lower row the knob 28 provides a selection between play-back operations and operations in conjunction with the heart sound simulator (console 11). Knob 29 provides selection between log and linear patterns for the scope and control 31 is used to provide On-Off and volume control for the stethophone jacks 16. A signal light 32 is used to indicate when the display unit 12 has been turned on.

The controls for the console 11 are best identified in FIG. 2. Here the knob 33 provides a selection between heart sound simulator and patient oriented usages. The knob 34 controls a high pass filter with the high limit variable from 0 to 500 Hz for analysis of patient derived sounds. A volume control 36 is provided, while 37 identifies a microphone input jack. The elements 33 through 37 are all related to an auscultation unit 35 which is used in the study and dissemination of patient related sounds and other patient heart related signals. An adjacent manual sound selector component 40 provides additional capabilities for the heart sound simulator so that separate bands of sound energy may be manually selected. The controls 41 and 42 provide the high and low cut off limits for a variable pass filter sound source. Knob 43 controls the selection of sign wave signals that are used for an additional sound source. Cyclic energy of sign wave characteristic with frequencies of 50, 60, 100, 150, 300, 400 and 500 Hz are provided. The control 44 provides a selection between automatic and manual operations of the heart sound simulator.

The control component 45 is a rotary selector with separate rotary switches being provided for each of the channels B, C, D and E. The number indications of the exposed surface of the rotary switches correspond to the particular band sounds that are selected for each of the channels. In the particular display shown, band 1 is connected into channel B, band 4 is connected into channel C, etc. This control is similar to the manual band selection used in the previous patent embodiment. This feature makes it possible for an operator to control the sound output by substituting different sound sources in place of any initial selection. The feature is of special utility when used in connection with the auscultation unit for studies of abnormal patient sounds. A panel light 46 is also provided on the manual sound selector panel 40 to indicate when the heart sound simulator is being used in a manual mode.

Additional manual sound control capabilities are possible, since changes may be made even for channels that have been automatically selected. The knobs 51, 52, 53, 54 and 55, respectively, provide On-Off and volume control for channels A, B, C, D and E. Control knob 56 is used to vary the pulse or cycle rate for demonstration procedures. Cycle rate selections between pulse rates of 50 and 120 cycles per minute are available. The control knob 57 is used to regulate to volume of signals for combined output, and knob 58 regulates the tone thereof. The control button 59 actuates a moving table, while button 61 is used for turning power for console 11 on and off.

Figure 3:
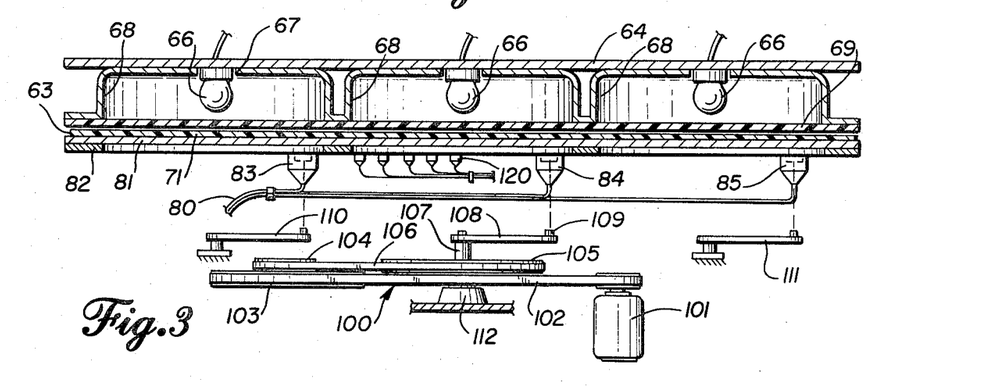
FIG. 3 is a partial cross-sectional elevation through the program card receptacle area of said console with some parts shown in extended position.
Figure 4:
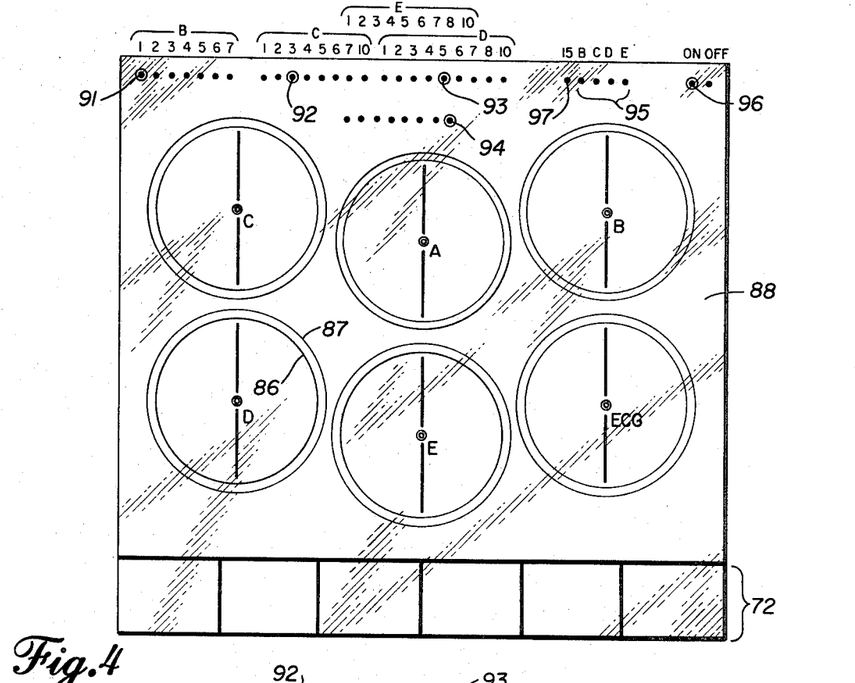
FIG. 4 is a layout diagram for the program cards that are to be made for use with said embodiment.
Figure 5:
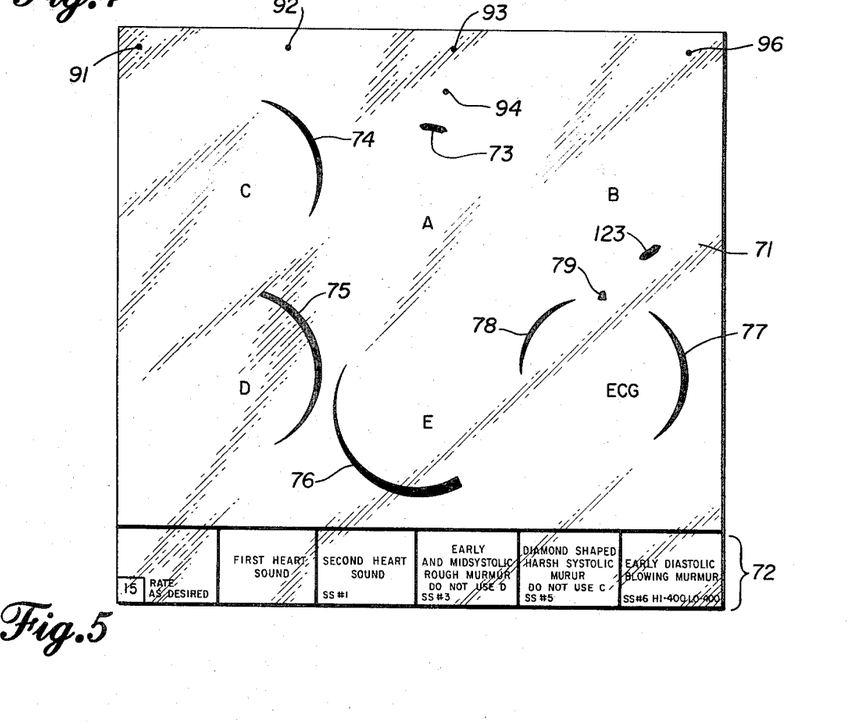
FIG. 5 is a representation of one program card for use with the invention; areas that are actually light transmissive are shown in black.

FIG. 3 provides a schematic type of illustration for the operative elements housed within the program section 60 of console 11. Such program section includes a lighting panel 62 disposed beneath the program receiving slot 63. When power is on the entire panel 62 is illuminated so that indexing information provided on an exposed edge of a program card can be more easily seen. This particular indexing section or area 72 of a program card 71 is shown in FIGS. 4 and 5. The components disposed within the program section 60 and beneath an exterior cover therefor are shown in FIG. 3. Such components are inclusive of a light mounting plate 64 on which a plurality of light sources 66 are mounted. Six of the light sources extend through openings 67 in opaque shields 68 that are of inverted pan shape. Six such shields 68 are provided in positions corresponding to the signal selection trace areas that are used for the program card. All of the shields 68 extend above a clear light translucent base 69 which is preferably of a clear plastic having good light diffusion characteristics. With this arrangement light derived from the sources 66 will illuminate sections of the plastic base 69 disposed beneath the shields 68. The light diffusion patterns can be quite uniform when an efficient base 69 is used.

An additional clear light transmitting plate 81 is provided within the compartment 60 in vertically spaced position with respect to the base 69. This vetically spaced positioning provides a receptacle for the introduction of the program cards 71. This spaced interval is maintained in registration with the slot 63, and it is accordingly again identified by such number. A moving table 82 is disposed beneath the plate 81. Six photosensitive elements, such as the photoelectric cells or resistors 83, 84 and 85 are mounted on the moving table 82 for movement therewith in circular patterns. Each of the photoelectric cells are at all times directly beneath one separate and distinct lighted area that is illuminated by one separate light source 66 and confined by one of the shields 68.

All the moving photoelectric cells are guided for movement along the paths shown in FIG. 4. Photocell 83 is associated with the channel D selection, and, accordingly, photocell 83 will move along a circular path defined by the layout lines 86 and 87 for the layout card 88 of FIG. 4. Photocell 84 will then be constrained in accordance with the channel E layout pattern, while photocell 85 will be used for the control of ECG signals and will move along the pattern shown on the layout card 88 identified by the combined letters ECG. All of the photoelectric cells that move with the table 82 are provided with separate circuit wires interconnecting such photocells and stationary terminals. These circuit wires are gathered in a bundle 80 that is flexed as the table 82 is moved. Such circuit wires transmit band sound signals that are passed by the moving photocells which accordingly act as signal gating means. Band sound signals will be passed for separate or combined output when light is transmitted through the program card 71 to activate a moving photoelectric cell.

Other moving photocells (not shown) will be mounted on the table 82 for movement along the trace patterns identified with channel C, A and B of the layout card 88. When a program card, such as the card 71, is being made, light transmissive areas of the program will all be arranged within the trace patterns defined on the program layout card 88 as represented by the lines 86 and 87 for the channel D selection. For the particular program set forth on program card 71, it will be noted that light transmissive areas (shown in black) are provided for each of the channels A through E as well as for the ECG. At any time that the photoelectric cells are disposed beneath the transparent areas diffused light from the light sources 66 will be transmitted through such transparent areas to be received by and to activate the associated photoelectric cells.

With the new equipment it is noted that different sound characteristics and release patterns can be obtained when the transparent signal areas of the program card are made in distinctive shapes. A characteristic first heart sound is provided on channel A by the trace 73. Channel C has a trace 74 with the entrance and terminal ends being tapered. Trace 75 and trace 76 of channel D and channel E, respectively, have tapered entrances and abrupt ends. The channel B signal shape for this particular program is similar to that for channel A. The ECG signal is characterized by a cyclic pattern having a long entrance trace 77, a shorter final trace 78, and an interposed abrupt trace 79 which provides the peak for an ECG signal. For most all demonstration programs the characteristic traces for the ECG and for channel A will be used. Slight changes of position may be made to demonstrate various heart conditions.

As shown by the layout pattern of FIG. 4, the program cards are used to select the particular sound bands that will be introduced to each of the channels. The large dots on layout card 88 identify additional light transmissive areas that are to be provided for program card 71. Band 1 is to be used for channel B. A first light dot 91 is, accordingly, located in the number 1 band position for channel B. For channel C a light dot 92 is disposed in the band 3 position. For channel D a light dot 93 is disposed in the band 5 position, and for channel E a light dot 94 is disposed in the band 8 position. Similarly, a light dot 96 is positioned in the "on" position to provide automatic operation of the heart sound simulator. No particular light dots or openings are provided in the area 95 for the demonstrations to be made in connection with the program card 71. Light transmissive openings are to be provided in these positions when alternate manual selection between any of the channels B, C, D and E is to be used supplementary to or in cancellation of set automatic selections. A separate position 97 is used to locate a light transmissive dot when a cycle rate of 15 RPM is to be used for the table drive in place of the normal rates of between 50 and 120 RPM. This position will be used when the apparatus is operated to demonstrate non-regular pulse rates and/or intermittent heart abnormalities. This is a particularly useful selection when arrhythmic heart conditions are to be demonstrated.

A table drive mechanism 100 is provided to move the support table 82 and the photoelectric cells mounted thereon in a translational pattern having circular characteristics. To provide this motion a variable speed drive motor 101 is interconnected by a belt 102 to a set of idler pulleys 103 and 104. The belt 102 rotates the pulleys 103 and 104 with pulley 104 being itself connected to a central drive pulley 105 by a transmission belt 106. A shaft 107 is rotated on its anchored pivot support 112 by such drive components to rotate eccentric crank arm 108. A pin 109 on the end of such crank arm, which is shown at an extended position, is actually pivotally engaged to the table 82. This engagement moves the point of engagement for the table in a circular pattern. Follower cranks 110 and 11 having a throw identical to arm 108 pivotally support and interconnect the moving table 82 and a fixed base of console 11 so that the entire table 82 will be moved in the characteristic circular pattern. With this arrangement all of the moving photoelectric cells will be constrained to move along the trace patterns shown by layout card 88 of FIG. 4. Operation of these photosensitive elements to provide signal gating capabilities is then controlled by the transmission or non-transmission of light at positions along the defined trace patterns as the photo elements move in their respective orbits. A plurality of separate band selector photosensitive elements are placed in fixed positions in the program compartment 60 at locations that correspond to the band positions identified on the layout card 88 of FIG. 4. These photoelectric cells are shown in smaller size, and they are identified collectively by the number 120. They do not move with the table 82. Separate light sources (not Shown) are provided for illumination of the area to be indexed by the photo cells 120. In the operation of the device only those cells that are beneath a light transmissive opening, such as the openings 91 through 94 and 96, will be actuated. When the particular circuits identified with the separate light cells 120 are activated, various provided sound bands can be intercoupled into the separate control channels A through E and ECG.

In the mentioned previous patent various bands of sound related energy were provided for introduction to separate circuits controlled by photosensitive means. The separate bands of sound energy were selectively recombined by the photo circuits to provide a combination heart sound. In the present apparatus similar results are obtained with the combined simulated heart sound again being made up of a plurality of component heart sounds. Separate bands of sound are derived from a source providing a full range of sound related energy. This initial sound source is introduced to band pass filters to provide initial sources of sound energy in discrete frequency band ranges with each band having defined limits. In the present apparatus these sound sources derived as the output of band pass filters are supplemented through use of additional sources for sound related energy.

Figure 7:
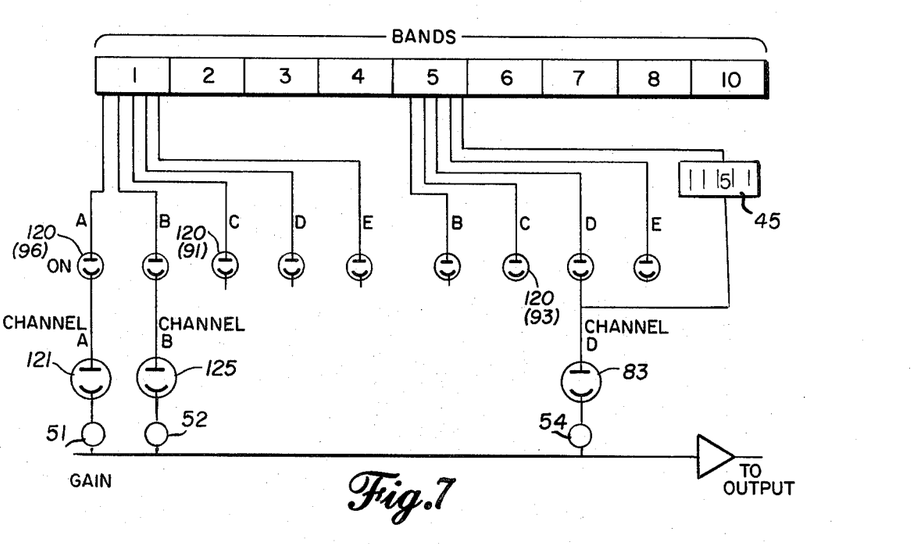
FIG. 7 is a partial schematic diagram illustrating features of some circuits for the instrument.

FIG. 7 presents a partial schematic detail that is of interest in connection with further explanation of operations controlled by program cards or manual selection. In FIG. 7 bands 2 through 6 and 10 provide sound sources that are derived from operation of the described band pass filters. Representative frequency ranges for such bands could be as follows:

Band 2 — 70 to 110 Hz
Band 3 — 120 to 200 Hz
Band 4 — 340 Hz fixed
Band 5 — 130 to 400 Hz
Band 6 — 90 to 150 Hz
Band 10 — 160 to 320 Hz.

The sound energy available from band 1 is derived from an oscillator, and it provides a square wave sound source of 78 Hz. Band 7 has an oscillator source providing a 60 Hz sign wave. Band 8 has an oscillator source providing a 180 Hz sign wave. The first heart sound of the combined simulated pulse cycle is provided by band 1. Accordingly, in a representative program card selection using card 71 as a sample, band 1 is coupled through one of the small permanently mounted photoelectric cells 120 (96) to a moving photoelectric cell 121 for channel A. Since band 1 is selected by program card 71 for channel A through provision of the light transmissive area 96, a band 1 signal passes to the rotating photo cells 121, and the signal will be released to output at any time that a light transmissive opening, such as the opening 73, occurs in the trace pattern of moving photo cell 121. A separate gain control corresponding to On-Off and volume control 51 is provided for this channel A signal.

For the layout of FIG. 4 and the program card of FIG. 5, channel B is also to be connected to band 1. This connection is accomplished when the photo cell 120 (91) is activated by light energy passing through the light opening 91. The band 1 signal will be transmitted to the channel B rotating photo cell 125 for introduction to output at any time that a light transmissive opening, such as the opening 123, in the channel B trace pattern is intercepted. Band 3 will be connected into channel C in similar manner. Band 8 is connected into channel E. A signal in channel E is transmitted to output whenever the moving photoelectric cell 84 is activated by light transmitted through the light opening 76 of program card 71 shown in FIG. 5.

As a further example, the interconnection of band 5 through channel D to output is shown in FIG. 7. As indicated in FIGS. 4 and 5, the light opening 93 for channel D is positioned in the band 5 location. Light transmitted through this opening or light transmissive area 93 then will activate the permanently positioned small photoelectric cell 120 (93) and a signal will thereby be transmitted to moving photoelectric cell 83 which is shown to follow the channel D trace pattern. Whenever the rotating cell receives light transmitted by the light transmissive area 75 of program card 71, this band 5 signal from channel D will be transmitted to the output amplifiers for release by the speaker 14 or any of the stethophone jacks 16. All of channels A through E are provided with separate gain controls 51 through 55.

In the presentations of FIG. 4, it is shown that a considerable range of sound sources may be selected for introduction to any of the channels A through E. A separate signal will be transmitted to a separate ECG output by the moving photoelectric cell 85 whenever light is transmitted by the openings 77, 78 and 79. The duration of any sound or ECG signal that is to be transmitted can be regulated by changing the arc length of the light transmissive openings. The characteristics of the sound or EcG signal emitted can be further modified by changes in the shaping of the light transmissive openings.

In order to isolate any of the separate sounds, the instructor or student can separately control the signal that would otherwise be emitted by any of the channels A through E and ECG even when program cards are being used. When the separate sounds are thus isolated, identification of such sound can be established, and the student can thereafter better identify the sound when it is combined with the full output of all the additional channels then being programmed by the particular program card. On the program card 71 of FIG. 5 the printed materials in the indexing section 72 of the program card indicate in the fourth block that if you are to observe a mid systolic rough murmur, you are not to use channel D. The fifth block indicates that other observations can be made when you do not use channel C.

On observation of the card 71 it will be seen that the particular signal release times for channels C and D coincide, since the signals for these channels will, therefore, be imposed one on the other, and the identification of the separate sounds would be complicated or impossible without a capability for separately controlling release of these sounds. Instructions for all such required manual manipulations are now presented in the indexing section 72 of the program card. All changes suggested for further studies are accomplished by manual manipulation of controls 51 through 55 to turn the channels on or off or to change the volume output thereof. The output from controls 41–43 can also be introduced to any channel by using manual selector 45.

With other programs it is often disruptive of the instruction procedures if more than one channel is on at any particular time. The outputs from the permanently mounted photo cells 120 beneath the area 95 are combined into a balanced circuit in order to control situations where the provided instructions have not been properly followed. If only one channel, such as channel E, is to be used for an instructional purpose, the operator's erroneous manual selection of an additional channel will change the resistance balancing in the circuit, and the light associated with moving table button 59 will flash intermittently until the error is corrected.

If a light transmissive opening is provided at position 97, the present instrument can be used to demonstrate arrhythmic heart conditions. The program card 131 shown in FIG. 6 has a light transmissive opening 97 at the 15 position. In order to demonstrate arrhythmic conditions, it is necessary that a plurality of successive pulse cycles be presented in order to show the time relationships between successive pulse cycles. To provide this capability the program cards are changed to provide a succession of light transmissive areas or openings for a multi-pulse cycle. When a light opening 97 is provided, the speed of the drive motor 101 is changed to provide rotation of the moving table 82 at the rate of 15 RPM instead of at the standard variable base rate having a range of 50 to 120 RPM. With the table moving at 15 RPM multiple pulse traces may be presented in the trace path for each of the channels A through E and ECG.

Figure 6:
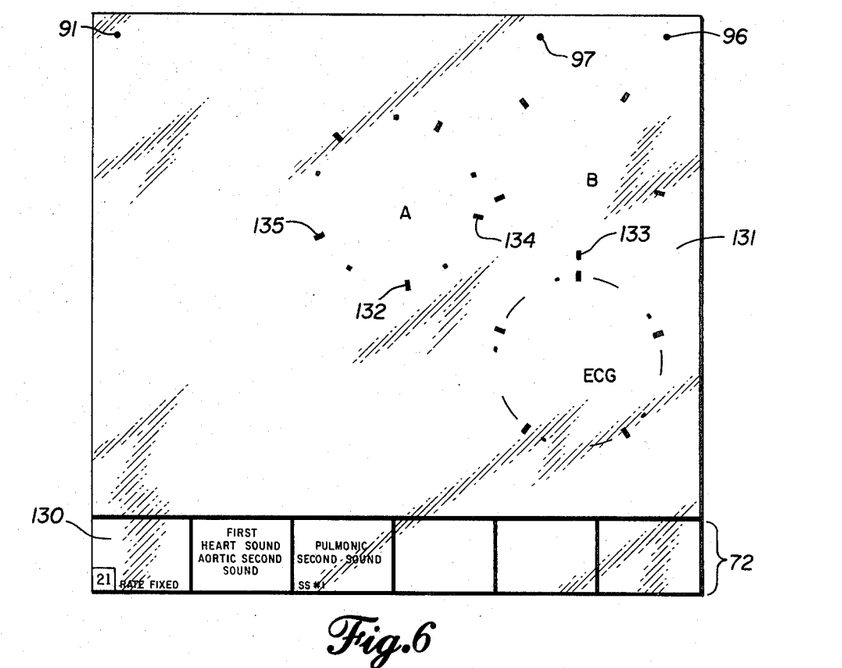
FIG. 6 is a program card for the presentation of repetitive pulse cycles as used in connection with studies of arrhythmic heart conditions.

On the program card 131 of FIG. 6 the ECG pattern presents a succession of five ECG signals. At the channel A position a succession of five successive first heart sound signals are provided. Further, channel B provides a similar succession of five signals. Channel A is still connected into band 1, and the light transmissive opening 91 serves to similarly connect channel B to band 1. The particular program card 131 illustrated has indexing information or a title in block 130 indicating "Splitting of the second sound with a right bundle branch block." The signals emitted by the openings 132 and 133 are not synchronized, and, accordingly, a split sound will be emitted. On similar cards where the 15 RPM rate is used the spacing between successive light openings may be changed. If the distance between the light openings 132 and 134 is different than the distance from 132 to the opening 135, an arrhythmic sound presentation will result. Observation of such irregularities is of importance in the field of cardiology, and, accordingly, the provision of this additional capability substantially expands the field of utilization for the present sound simulator equipment.

In addition to a schematic representation of the program card selection operations for the present embodiment, FIG. 7 further indicates a representative connection and use for the manual selector 45. In this Figure it is shown that band 5 is also connected to manual selector 45. All of the other bands and the outputs from 41–43 can be connected through the control 45 to any of the channels B through E. A representative connection of band 5 through channel D is indicated. This alternate selection of bands and channels is available when the control 44 is in the manual position. In the use of such manual selection a program card having trace patterns for the respective channels will still be used and the table will still be energized to cause the moving photoelectric cells to follow the prescribed patterns. The channel selections initially programmed by light openings in a program card are ineffective when the control 44 is in the manual position. The present heart sound simulator, accordingly, provides alternate means for the selection of the sound bands that are to be selectively released by the moving photoelectric cells. Any of the derived component or combined sound signals can be displayed on the oscilloscope 13 of the display unit 12. The electrocardiogram signal from the ECG trace may be displayed separately or together with output sounds disseminated by the speaker 14 or phone jacks 16. A signal trace pattern for any sound related signals can also be displayed on the oscilloscope 13. All of the sound signals and the electrocardiogram signals can also be recorded for later use by the play-back recorder 17. Because of the nature of the electrocardiogram signals, modulator and demodulator components can be used in order to record and playback the signals to avoid interference with the audio signals. A multi-channel recorder is provided especially where the present apparatus is to be used in conjunction with the Blood Pressure Teacher disclosed in the mentioned copending application of Abe Ravin.

In usage with such apparatus the components of the heart sound simulator console 11 will be used to simulate the Korotkoff sounds associated with the taking of blood pressures. Such sound signals and operator signals for the blood pressure dial apparatus will be presented on the tape recorder. The play-back output from the tape recorder will then be used to actuate the blood pressure indicator simultaneously with the sound presentations deliverable to the speaker 14 of the present apparatus.

The auscultation unit 35 shown herein also utilizes many of the components of the total heart sound simulator apparatus. Where studies are to be made of a patient's heart sounds, a pickup microphone (not shown) is connected to the microphone jack 37. A patient derived signal from the microphone is delivered to a high pass filter with the control knob 34 being used to selectively adjust the high limit for the frequency of patient signals that are to be presented by the speaker 14 or to the oscilloscope 13 of the display unit. Volume control 36 is disposed in such circuit and is used for adjusting the output volume of the patient's heart sounds. The selector 33 may be used to change the presentations of the speaker and oscilloscope immediately from patient related to heart sound simulator derived signals. With this arrangement the observed sounds of the patient's heart can be matched with signals derived from the heart sound simulator apparatus itself. A program card having representative trace patterns for any suspected abnormalities can be inserted in the receptacle 63, and the output sounds and signals can then be compared with actual patient observations. If a close match cannot be made through use of a provided program card, the control elements of the adjacent manual sound selector component 40 may be used to change the input band derived signals that are interconnected to the channels A through E and ECG. Additionally the controls 41 through 43 may be used to introduce a signal of adjusted high and low values through use of controls 41, 42 and channel selector 45. An input sign wave signal of varied frequency may also be used through conjoint operation of the knob 43 and channel selector component 45. To facilitate cross matching of output signals without excessive disturbance of the patient, the patient derived sounds can be recorded for subsequent play-back. A balance can then be made between the recorded patient signals and the automatic or manually adjusted output of the heart sound simulator.

Many separate program cards are provided in order to teach a full range of auscultation procedures and potential observations. For any program card being used the index section 72 will at all times be exposed for operator viewing. The instructions that may be presented in such section can greatly aid the teaching procedures. Such instructions and the relative positioning of the instructions adjacent the controls 51–55 for the separate channels serve to avoid most operator errors so that an improved teaching result is obtained.

These improved teaching results are greatly facilitated by the provision of the automatic selection features of the present invention. The use of photosensitive means to select the sources of component sound energy and also to provide a moving signal gating means are characteristic of the present invention. It is recognized, however, that such beneficial result is not totally dependent upon the use of "openings," "signal transmissive openings" or "tramsmissive areas or openings." For purposes of definition the word "opening" as used in the following claims is not meant to be confined to an actual physical opening or hole in the program element. The simple provision of discrete areas for the transmission of signals is to be considered within the scope of the word "opening" as used in said claims.

We claim:
1. Apparatus presenting sounds and visual materials for teaching auscultation procedures and techniques comprising a plurality of circuits with each said circuit providing a separate source of sound related signals and with the output of each said sound source being characteristic of a component of combined sounds that may be observed, a plurality of moving signal gating means with each said moving element being adapted for selectively receiving and transmitting signals derived from said sound source circuits, a program element having signal transmissive openings therein for interposition between said sound source circuits and said signal gating elements with said openings being positioned to regulate selective interconnection of said sound source circuits and said signal gating means, and a program element receptacle for receiving said program element in regulated position whereby selected sound source circuits will be interconnected with selected signal gating elements to provide a desired combined sound output 2. The apparatus as set forth in claim 1 wherein said signal gating elements operate intermittently to provide pulsed cycles of component sounds.

3. Apparatus as set forth in claim 2 wherein said plurality of signal gating elements are constrained for movement along separate paths.

4. Apparatus as set forth in claim 3 wherein the movement patterns for said signal gating elements are curvilinear.

5. Apparatus as set forth in claim 3 wherein the movement patterns for said signal gating elements are non-concentric.

6. Apparatus as set forth in claim 3 wherein a plurality of signal transmitting openings are provided in positions oriented with the movement patterns for said signal gating elements for regulation of the operation of said elements.

7. Apparatus as set forth in claim 3 and further comprising a moving table support for said apparatus with said moving table providing support for and carrying said signal gating elements.

8. Apparatus as set forth in claim 7 wherein said table is moved translationally in a defined curvilinear path.

9. Apparatus as set forth in claim 8 wherein said signal gating means and table move conjointly with the separate signal gating means being moved in adjacent circular paths.

10. Apparatus as set forth in claim 1 wherein said signal gating elements are photosensitively actuated by changes in impinged light.

11. Apparatus as set forth in claim 10 and further comprising a plurality of separate light sources for said apparatus with each said light source being disposed in position corresponding to the movement pattern for one of said signal gating elements.

12. Apparatus as set forth in claim 11 wherein the signal gating openings for said program card are light transmissive and are disposed along the movement pattern for said signal gating element.

13. Apparatus as set forth in claim 1 wherein said signal gating elements comprise a main control for the release of selected component sounds and further comprising auxiliary controls for operator manipulation to further regulate the sounds that are otherwise passed by said signal gating elements.

14. Apparatus as set forth in claim 13 wherein said auxiliary controls provide On-Off and volume control for said apparatus.

15. Apparatus as set forth in claim 13 and further comprising manual controls for the manual selection of the sound source circuits whereby the signals of manually selected sound sources may be additionally interconnected to said signal gating elements.

16. Apparatus as set forth in claim 1 and further comprising an indexing section on said program element for the presentation of visual instructions with said index section being exposed for operator viewing when the program element is in operative signal gating usage.

17. Apparatus as set forth in claim 16 and further comprising photosensitive elements permanently positioned for the control of said sound source circuits.

18. Apparatus as set forth in claim 17 wherein photosensitive elements are additionally utilized for said signal gating means.

19. Apparatus as set forth in claim 17 wherein the signal gating openings for said program element are light transmissive and are disposed in position of registration with said photosensitive elements.

20. Apparatus as set forth in claim 19 wherein photosensitive elements are used both for circuit selection and signal gating functions and some of said light transmissive openings are disposed along the movement path of said signal gating elements.

21. Apparatus as set forth in claim 16 and further comprising a display unit for said apparatus, and means providing an electrocardiogram signal on one circuit of said apparatus for selection and selective release by operation of said program and signal gating elements.

22. Apparatus as set forth in claim 16 and further comprising a moving table support for said apparatus with said moving table providing support for and carrying said signal gating elements, and motor drive means for moving said table.

23. Apparatus as set forth in claim 22 and further comprising speed change controls for said motor whereby the speed of movement of said signal gating means is changed.

24. Apparatus as set forth in claim 23 wherein a plurality of cyclic traces are provided on said program element in successive positions disposed about the movement pattern for said signal gating means whereby a plurality of heart sound cycles can be presented successively.

25. Apparatus as set forth in claim 24 wherein the spacing patterns for signal transmissive openings are irregular for the presentation of arrhythmic heart studies.

26. Apparatus as set forth in claim 24 wherein light transmissive openings are provided on said program element for changing the relative speed of said motor and moving table in keeping with the signal gating operations of the particular program element.

27. In a heart sound simulator for the simulation of the component and combined sounds of the heart wherein said component sounds are derived from separate sound sources and being further inclusive of signal gating and program elements for regulating the cyclic presentation of said component sounds to provide a heart sound signal, a patient auscultation unit comprising a microphone pickup for receiving a signal related to the actual sounds of a patient's heart, output means for the dissemination of said patient derived signal, and a variable high pass filter in the circuits intermediate said pickup and output whereby patient derived sounds above selected ranges may be eliminated.

28. Apparatus as set forth in claim 27 wherein the range for said variable high pass filter is 0 to 500 Hz.

29. Apparatus as set forth in claim 27 and further comprising means whereby the patient derived heart sound signal can be presented for comparison with a simulated heart sound signal released by said heart sound simulator.

30. Apparatus as set forth in claim 27 and further comprising signal trace display apparatus for interconnection with said auscultation unit circuits for the display of a patient derived phonocardiogram.

* * * * *